US012219477B2

(12) United States Patent
Silverman et al.

(10) Patent No.: US 12,219,477 B2
(45) Date of Patent: Feb. 4, 2025

(54) RESTRICTED TARGET WAIT TIME INTERFERENCE DETECTION AND MANAGEMENT

(71) Applicant: Cisco Technology, Inc., San Jose, CA (US)

(72) Inventors: Matthew Aaron Silverman, Shaker Heights, OH (US); Pooya Monajemi, Irvine, CA (US); Ardalan Alizadeh, Milpitas, CA (US); Sivadeep Reddy Kalavakuru, Akron, OH (US)

(73) Assignee: Cisco Technology, Inc.

( * ) Notice: Subject to any disclaimer, the term of this patent is extended or adjusted under 35 U.S.C. 154(b) by 360 days.

(21) Appl. No.: 17/816,877

(22) Filed: Aug. 2, 2022

(65) Prior Publication Data
US 2024/0049133 A1 Feb. 8, 2024

(51) Int. Cl.
*H04W 52/02* (2009.01)
*H04W 52/28* (2009.01)
*H04W 72/0446* (2023.01)
*H04W 74/0816* (2024.01)

(52) U.S. Cl.
CPC ....... *H04W 52/0216* (2013.01); *H04W 52/28* (2013.01); *H04W 72/0446* (2013.01); *H04W 74/0816* (2013.01)

(58) Field of Classification Search
None
See application file for complete search history.

(56) References Cited

U.S. PATENT DOCUMENTS

| 2016/0381704 A1 | 12/2016 | Chu et al. |
| 2018/0295573 A1 | 10/2018 | Gidvani et al. |
| 2021/0014906 A1 | 1/2021 | Wang et al. |
| 2024/0049133 A1* | 2/2024 | Silverman ......... H04W 52/0216 |

FOREIGN PATENT DOCUMENTS

| EP | 3820225 A1 | 5/2021 |
| WO | 2020061721 A1 | 4/2020 |

* cited by examiner

*Primary Examiner* — Gary Lafontant
(74) *Attorney, Agent, or Firm* — Merchant & Gould P.C.

(57) ABSTRACT

Network traffic interference detection and management may be provided. An infringement event by an infringing Access Point (AP) on a Restricted Target Wake Time (rTWT) transmission opportunity (TxOp) associated with a victim AP may be detected, and information associated with the infringement event may be added to an infringement list, wherein the information includes a MAC address associated with the infringing AP. A controller, may receive the infringement list and notify the infringement event to the infringing AP. The infringing AP may determine whether a transmission associated with the infringement event is low latency and high priority. When the transmission is not low latency and high priority the infringing AP may modify future transmissions based on the notification. When the transmission is low latency and high priority the infringing AP may notify the controller that the transmission is low latency and high priority. The controller may then create a negotiation between the victim AP and the infringing AP, wherein the negotiation comprises managing future transmissions of the victim AP and the infringing AP.

20 Claims, 5 Drawing Sheets

RESTRICTED TARGET WAIT TIME INTERFERENCE DETECTION AND MANAGEMENT

TECHNICAL FIELD

The present disclosure relates generally to providing network traffic interference detection and management.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Network traffic interference detection and management may be provided. An infringement event by an infringing Access Point (AP) on a Restricted Target Wake Time (rTWT) transmission opportunity (TxOp) associated with a victim AP may be detected, and information associated with the infringement event may be added to an infringement list, wherein the information includes a MAC address associated with the infringing AP. A controller may receive the infringement list and notify the infringement event to the infringing AP. The infringing AP may determine whether a transmission associated with the infringement event is low latency and high priority. When the transmission is not low latency and high priority the infringing AP may modify future transmissions based on the notification. When the transmission is low latency and high priority the infringing AP may notify the controller that the transmission is low latency and high priority. The controller may then create a negotiation between the victim AP and the infringing AP, wherein the negotiation comprises managing future transmissions of the victim AP and the infringing AP.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Devices, such as stations (STA), may implement power-saving mechanisms including sleeping between access point (AP) beacons and waking up to transmit date. Restricted Target Wake Time (rTWT) establishes a period for a device to wake up and send and/or receive data. Using rTWT allows devices, an AP for example, to avoid transmitting Physical Layer Protocol Data Units (PPDU) beyond a period specified by a rTWT. Thus, network traffic may be more deterministic with predictable start times, fewer delays, and better support for traffic scheduling, such as the Institute of Electrical and Electronics Engineers (IEEE) 802.1Qvb traffic scheduling.

Overlapping Basic Service Sets (OBSS), including co-channel APs and associated clients, may exceed or overlap with rTWT periods of other APs because the devices may be unaware of other devices' rTWT schedule. For example, the potentially interfering devices may have transmit power and/or Multi Input-Multi Output (MIMO) differences from the AP, so the devices may be unaware of the AP's rTWT schedule and cannot receive a signal from the AP when the AP reserves rTWT periods with Network Allocation Vector (NAV) protection. Additionally, an AP may be unable to detect infringement of a rTWT period due to collisions.

Figure 1:
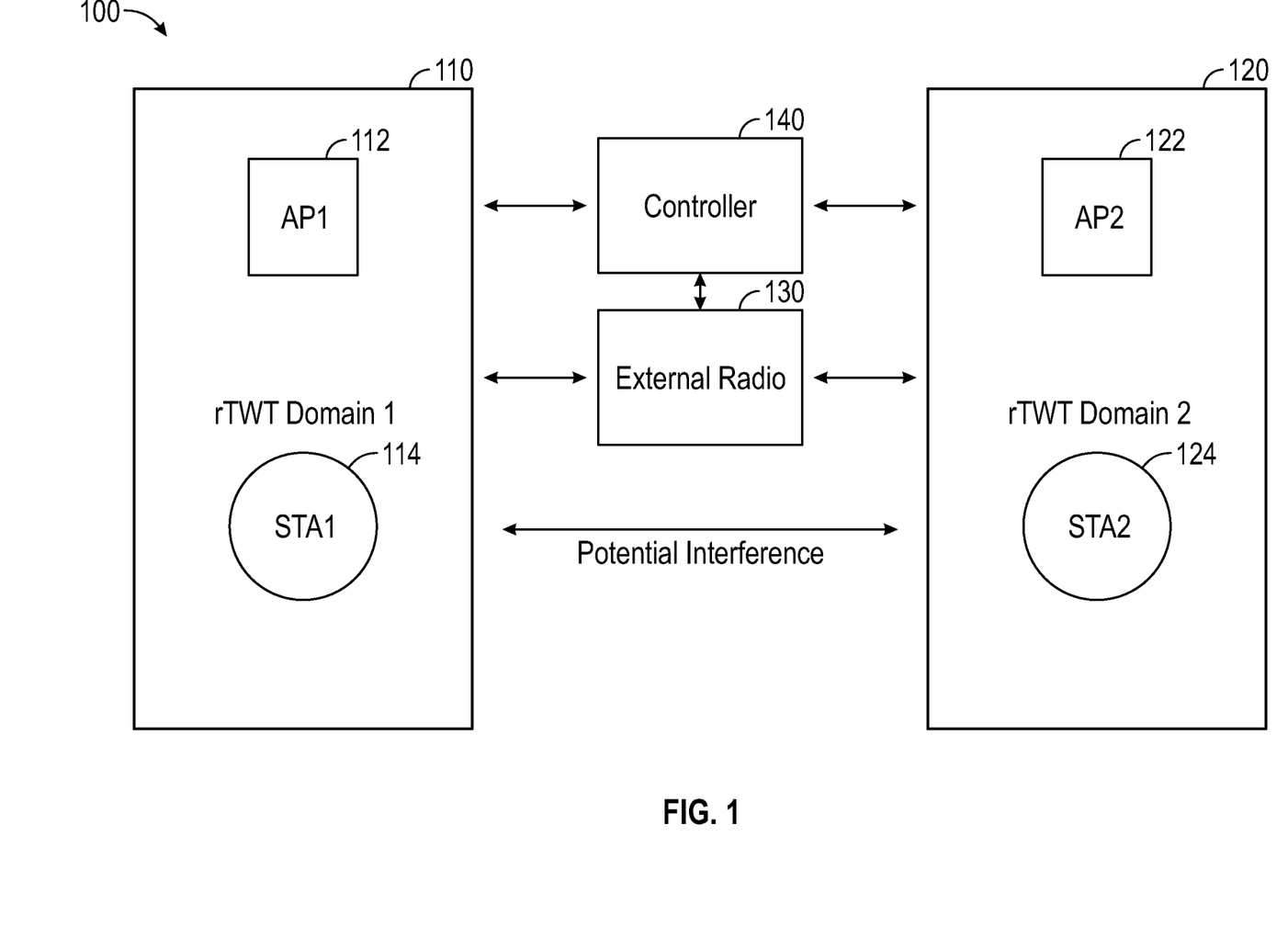
FIG. 1 is a block diagram of an operating environment for providing network traffic interference detection and management.

FIG. 1 is a block diagram of an operating environment 100 for providing network traffic interference detection and management. The operating environment 100 may include a basic service set (BSS) 110 with an AP 112 and a station (STA) 114, a BSS 120 with an AP 122 and a STA 124 in, an external radio 130, and a controller 140. The BSS 110 and the BSS 120 may overlap, which may cause the rTWT periods of the BSS 110 and rTWT periods of the BSS 120 to be interfered with. The controller 140 may be a wireless local area network (WLAN) controller, a network controller, or the like.

The AP 112 may create a WLAN for the STA 114 to connect to the network. The AP 112 may allow any number of STAs in the BSS 110 to connect to the network. Similarly, the AP 122 may create a WLAN for the STA 124 to connect to the network. The AP 122 may allow any number of STAs in the BSS 120 to connect to the network. The AP 112 and the AP 122 may both schedule rTWT transmission opportunities (TxOp) for STAs and the AP itself in the BSS 110 and the BSS 120, respectively. However, because the BSS 110 and the BSS 120 overlap, the AP 112 and/or STA 114 may interfere with one or more rTWT TxOps scheduled by the AP 122, and the AP 122 and/or STA 124 may interfere with one or more rTWT TxOps scheduled by the AP 112.

The AP 112 and the AP 122 may both monitor to detect infringement events during rTWT TxOps. For example, the AP 112 may have a scheduled rTWT TxOp for the STA 114 to transmit data. The AP 122 may transmit data during the scheduled rTWT TxOp and therefore infringe on the rTWT TxOp.

If an AP, such as AP 112 or AP 122, detects an infringement event, the victim AP may store information about the infringement event in an infringement list. The information about the infringement event may include the Media Access Control (MAC) address of the AP 122, the MAC address of the STA associated with the infringement event, the rTWT TxOp that was infringed, and other information about the AP 122, the transmission of the AP 122 associated with the infringement event, and the rTWT TxOp (e.g., infringing AP metadata, infringing STA metadata, victim AP metadata, victim STA metadata, whether the infringing traffic is high latency or low latency, whether the infringing traffic is high priority or low priority). An infringing STA may be a STA that is transmitting data, such as to an AP, during a rTWT TxOp, and an infringing AP may be an AP that is transmitting data during a rTWT TxOp and/or is associated with an infringing STA. The infringement list may include data associated with multiple infringement events. The victim AP may send the infringement list to the controller 140.

The external radio 130 may also monitor for infringement events. The external radio 130 may be a scanning radio or a co-channel AP serving radio. The external radio 130 may receive the schedule of rTWT TxOps for any number of APs, such as the AP 112 and the AP 122. The external radio 130 may monitor for infringement events for all of the APs that the external radio 130 has rTWT TxOp schedules for and save the detected infringement events in an infringement list similar to the infringement lists stored by victim APs. For each infringement event, the infringement list may include information including the identity of the victim AP, the identity of the victim STA, the MAC address of the infringing AP, the MAC address of the infringing STA, information about the rTWT TxOp associated with the infringement event, the transmission associated with the infringement event, and the like. The external radio 130 may send the infringement list to the controller 140. A victim AP may not be able to identify some infringement events due to collisions and/or other interference that prevents the victim AP from identifying infringement events. Thus, the controller 140 may use the infringement list received from the external radio 130 to identify infringement events that the victim APs do not identify.

The controller 140 may use the infringement list received from the victim AP(s) and/or the external radio 130 to notify infringing APs of infringement events caused by the associated infringing AP and/or infringing STA, determine adjustments to rTWT TxOp schedules to reduce and prevent future infringement events, conduct negotiations between victim APs and infringing APs to manage future transmissions, and the like. The notification the controller 140 sends to an infringing AP may include information for the infringing AP to determine how to stop infringing, including the identity of the victim AP, the identity of the victim STA, information about the rTWT TxOp associated with the infringement event, the transmission associated with the infringement event, and the like.

When the controller 140 notifies an infringing AP about an infringement event, the infringing AP may determine if the AP itself is infringing on the rTWT TxOp or an associated STA is infringing on the rTWT TxOp. If the AP itself is infringing, the AP may determine to modify its transmission schedule (e.g., the rTWT TxOp schedule) to prevent infringing on the rTWT TxOp or notify the controller 140 that the AP does not want to modify its transmission schedule, for example because the AP has a rTWT TxOp scheduled for the same time or the transmission is low latency and high priority. If a STA is infringing, the associated AP may determine whether the transmission by the STA is low latency and high priority. If the transmission by the STA is not low latency and high priority, the AP may instruct the STA to transmit future transmissions at a different time to prevent future infringement events. Additionally, the AP may decrease a requested power level on trigger based frames.

The infringing AP may also protect scheduled rTWT by performing a Clear to Send-to-Self (CTS2self). The infringing AP may also schedule trigger-based downlinks and/or trigger-based uplinks that excludes any infringing STAs.

If the transmission by the STA is low latency and high priority, the associated infringing AP may notify the controller 140 that the transmission associated with the infringement event is low latency and high priority. The controller 140 may determine to conduct a negotiation between the victim AP and the infringing AP to manage future transmissions, such as for example establishing how the schedule of the victim AP and/or the schedule of the infringing AP will be modified to prevent future infringement events. For example, the victim AP and/or the infringing AP may modify rTWT schedules to allow the victim AP and the infringing AP to transmit information without infringing. In another example, the infringing AP may notify the victim AP directly and conduct the negotiation.

For example, the AP 112 may detect the infringement by the STA 124. Therefore, the AP 112 is the victim AP, the STA 124 is the infringing STA, and the AP 122 is the infringing AP in this example. The AP 112 may store the information about the infringement event in an infringement list and send the infringement list to the controller 140.

The external radio 130 may also detect the infringement event by the STA 124. The external radio 130 may store information associated with the infringement event in an infringement list and send the list to the to the controller 140. In an example, only the external radio 130 detects the infringement event, stores the information in the infringement list, and sends the list to the controller 140 because the AP 112 does not detect the infringement event due to collision.

The controller 140 may determine that to notify the AP 122 using the infringement list from the AP 112 and/or the infringement list from the external radio 130. The notification may include the identity of the victim AP, the identity of the victim STA, the identity of the infringing STA, information about the rTWT TxOp associated with the infringement event, the transmission associated with the infringement event, and the like. The AP 122 may then determine whether the transmission from the infringing AP is low latency and high priority.

If the transmission is not low latency and high priority, the infringing AP may instruct the STA to transmit future transmissions at a different time that does not result in an infringement event. If the transmission is low latency and high priority, the infringing AP may inform the controller 140 that the transmission is low latency and high priority. The controller 140 may create a negotiation between the AP 112 and the AP 122. During the negotiation, the AP 112 and the AP 122 determine how each rTWT schedule should be modified to resolve the infringement events in the future.

Figure 2:
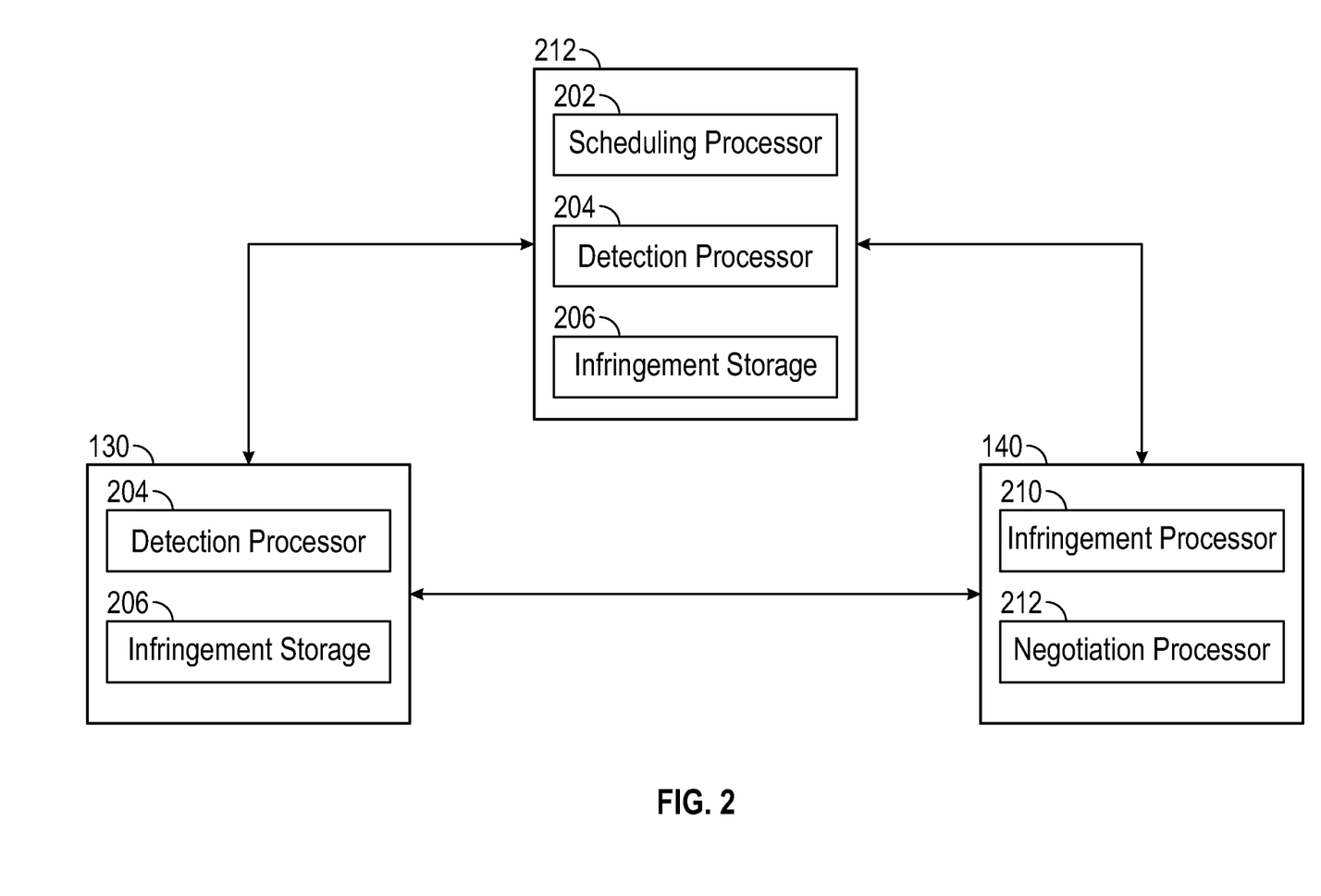
FIG. 2 is a block diagram of an access point, controller, and external radio for performing network traffic interference detection and management.

FIG. 2 is a block diagram of the operating environment 100 including the AP 112, the external radio 130, and the controller 140 for performing network traffic interference detection and management. The AP 112 may include a scheduling processor 202, a detection processor 204, and an infringement storage 206. The AP 122 may include the same components. The external radio 130 may include a detection processor 204 and an infringement storage 206. The controller 140 may include an infringement processor 210 and a negotiation processor 212.

The scheduling processor 202 of the AP 112 may schedule rTWT TxOps and negotiate with other APs when the controller 140 notifies the AP 112 that a negotiation is created in response to an infringement event. The detection processor 204 of the AP 112 and the external radio 130 may detect infringement events and collect information associated with the infringement events. The infringement storage 206 of the AP 112 and the external radio 130 may store an infringement list, and the detection processor 204 of the AP 112 and the external radio 130 may store information associated with infringement events in the associated infringement storage 206.

The infringement processor 210 may receive an infringement list from the AP 112 and/or the external radio 130. The infringement processor 210 may notify APs about infringement events where the AP is an infringer, including the AP 112, based on the received infringement lists. The negotiation processor 212 may conduct negotiations between APs to modify the rTWT schedules or otherwise prevent further infringement events.

Figure 3:
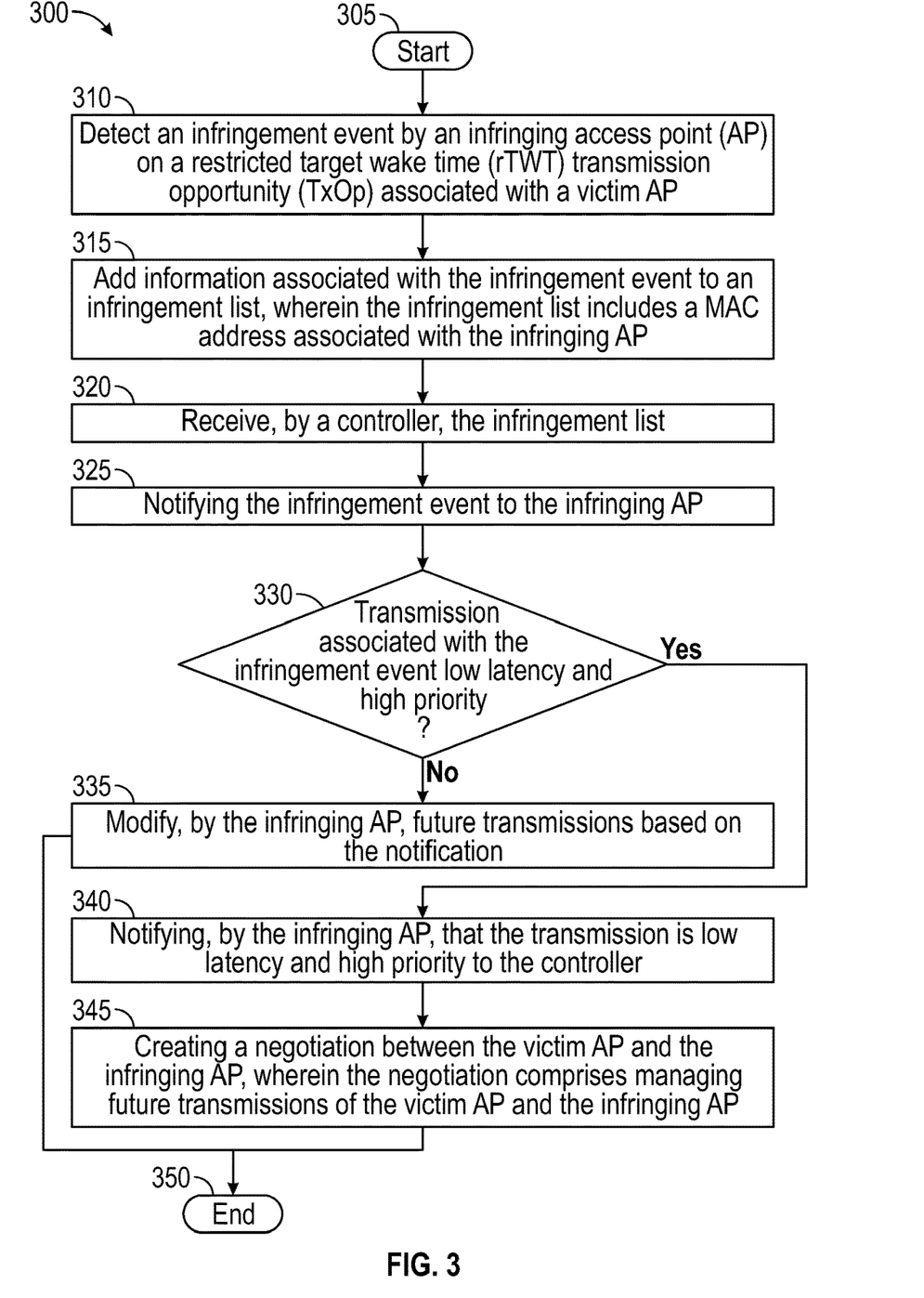
FIG. 3 is a flow chart of a method for providing network traffic interference detection and management.

FIG. 3 is a flow chart of a method 300 for providing network traffic interference detection and management. The method 300 may begin at starting block 305 and proceed to operation 310. In operation 310, an infringement event by an infringing AP on a rTWT TxOp associated with a victim AP is detected. For example, the AP 112 may be the victim AP and the AP 122 may be the infringing AP. The AP 112 and/or the external radio 130 may detect the infringement event.

In operation 315, the information associated with the infringement event to an infringement list, wherein the infringement list includes a MAC address associated with the infringing AP. For example, the victim AP (the AP 112) and/or the external radio 130 may add the information to the infringement list, including the MAC address associated with the infringing AP (the AP 122). A controller may receive the infringement list in operation 320. For example, the controller 140 receives the infringement list from the victim AP and/or the external radio 130.

In operation 325, the infringing AP is notified of the internment event. For example, the controller 140 notifies the infringing AP of the infringement event. The notification may include information about the infringement event for the infringing AP.

In operation 330, it is determined whether the transmission associated with the infringement event is low latency and high priority If it is determined that the transmission is not low latency and high priority in operation 330, the method 300 may proceed to operation 335. The infringing AP may modify future transmissions based on the notification. For example, infringing AP may modify the future transmissions to avoid infringing on the rTWT TxOp associated with the infringement event.

If it is determined that the transmission is low latency and high priority in operation 330, the method 300 may proceed to operation 340. In operation 340, the infringing AP may notify the controller, the controller 140 for example, that the transmission is low latency and high priority. A negotiation may be created between the victim AP and the infringing AP in operation 345. For example, the controller 140 may create the negotiation between the victim AP and the infringing AP, wherein the negotiation comprises managing future transmissions of the victim AP and/or the infringing AP. After operations 335 or operation 345, the method may proceed to ending block 350 and conclude.

Figure 4:
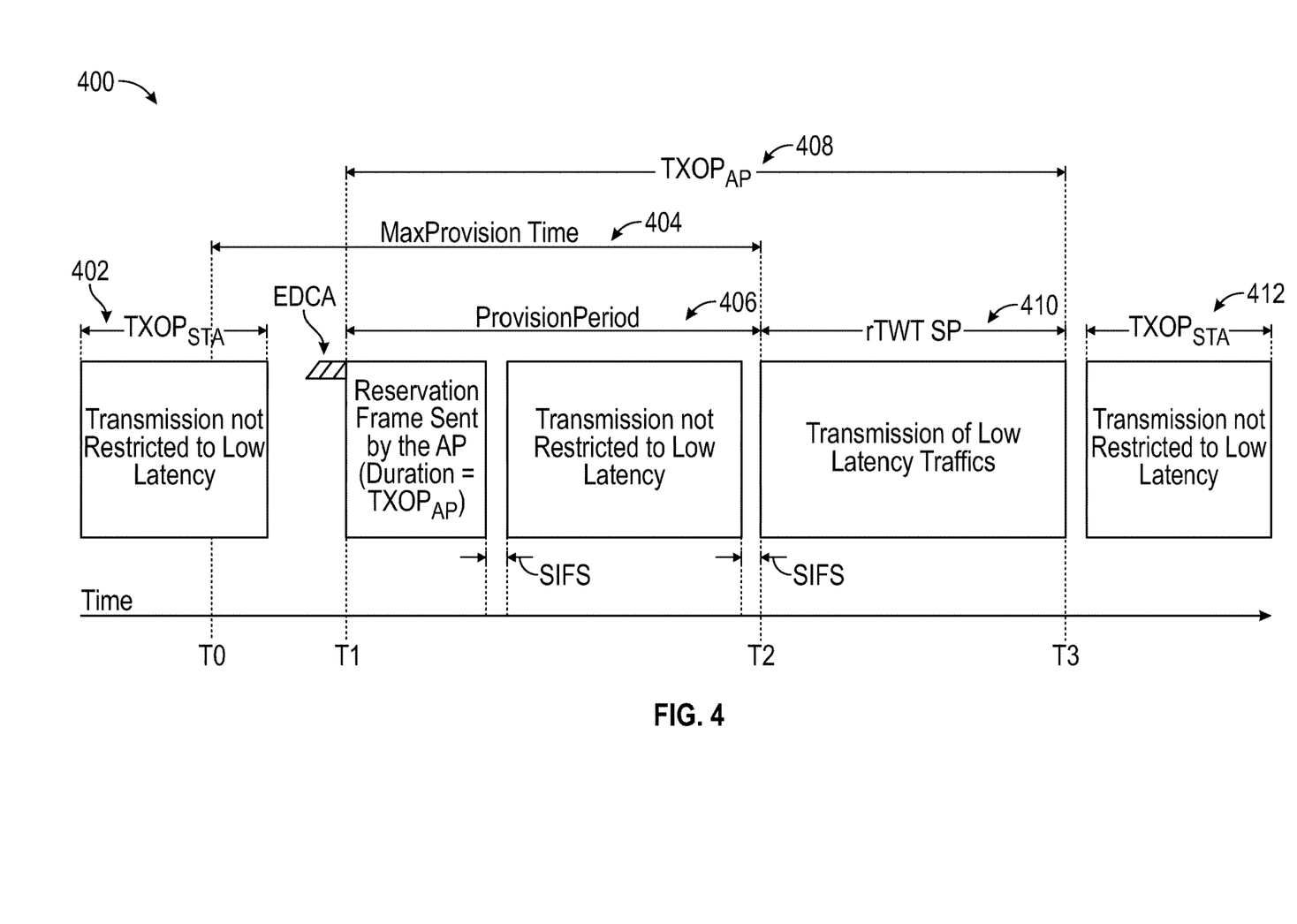
FIG. 4 is a block diagram of an example Restricted Target Wake Time schedule.

FIG. 4 is a block diagram of an example rTWT schedule 400. The rTWT schedule 400 may include a TxOp 402 for a STA, a max provision time 404, a provision period 406, a TxOp 408 an AP, a rTWT service period (SP) 410, and a TxOp 412 for a STA. The TxOp 402 for the STA may be a period of time scheduled by an AP for the STA to transmit data. The max provision time 404 may be the period for the provisioning the transmission. The provision period 406 may occur during the max provision time 404 and the TxOp 408 for the AP, and the provision period 406 may include a reservation frame sent by the AP indicating the length of the TxOp 408 for the AP and the transmission of traffic that is not low latency. The rTWT SP 410 may be during the TxOp 408 for the AP and may include the transmission of low latency traffic. The TxOp 412 may be a second TxOp for a STA.

The AP may detect an infringement event during the TxOp 402 for the STA, during the TxOp 408 for the AP, and/or during the TxOp 412 for the STA. Thus, the AP may store information associated with the transmission event in an infringement list.

Figure 5:
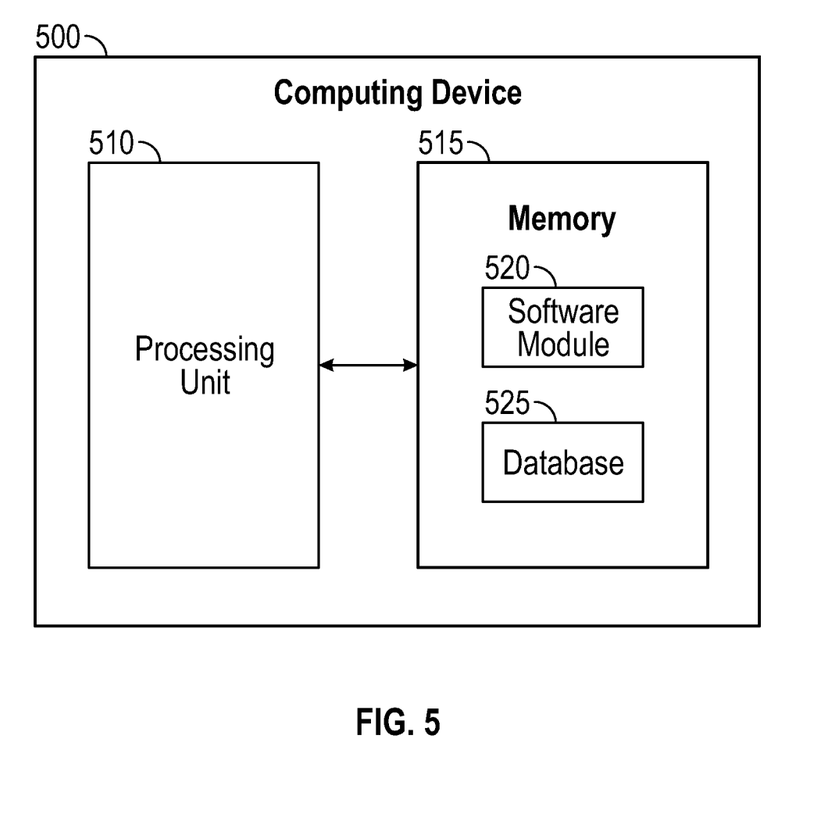
FIG. 5 is a block diagram of a computing device.

FIG. 5 is a block diagram of a computing device. As shown in FIG. 5, computing device 500 may include a processing unit 510 and a memory unit 515. Memory unit 515 may include a software module 520 and a database 525. While executing on processing unit 510, software module 520 may perform, for example, processes for providing network traffic interference detection and management as described above with respect to FIG. 1, FIG. 2, FIG. 3, and FIG. 4. Computing device 500, for example, may provide an operating environment for the AP 112, the AP 122, the STA 114, the STA 124, the external radio 130, the controller 140, and/or any other system described herein. The AP 112, the AP 122, the STA 114, the STA 124, the external radio 130, the controller 140, and/or any other system described herein may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
 detecting an infringement event by an infringing Access Point (AP) on a Restricted Target Wake Time (rTWT) transmission opportunity (TxOp) associated with a victim AP;
 adding information associated with the infringement event to an infringement list, wherein the information includes a Media Access Control (MAC) address associated with the infringing AP;
 receiving, by a controller, the infringement list;
 notifying, by the controller, the infringement event to the infringing AP;
 determining, by the infringing AP, whether a transmission associated with the infringement event is low latency and high priority;
 when the transmission is not low latency and high priority, modifying, by the infringing AP, future transmissions based on a notification; and
 when the transmission is low latency and high priority:
  notifying, by the infringing AP, that the transmission is low latency and high priority to the controller, and
  creating, by the controller, a negotiation between the victim AP and the infringing AP, wherein the negotiation comprises managing future transmissions of the victim AP and the infringing AP.

2. The method of claim 1, wherein the victim AP:
 detects the infringement event by the infringing AP; and
 adds the infringing AP to the infringement list.

3. The method of claim 1, wherein an external radio:
 detects the infringement event by the infringing AP; and
 adds the infringing AP to the infringement list.

4. The method of claim 1, wherein the transmission associated with the infringement event is by an infringing station (STA).

5. The method of claim 1, wherein managing the future transmissions of the victim AP and the infringing AP comprises (i) modifying a victim AP rTWT schedule, (ii) modifying an infringing AP rTWT schedule, or (iii) modifying the victim AP rTWT schedule and the infringing AP rTWT schedule.

6. The method of claim 1, wherein the rTWT TxOp is associated with a victim STA.

7. The method of claim 1, wherein the information associated with the infringement event further includes (i) a MAC address of an infringing STA associated with the infringement event, (ii) the rTWT TxOp, (iii) the transmission associated with the infringement event, or (iv) any combination of (i)-(iii).

8. A system comprising:
a memory storage; and
a processing unit coupled to the memory storage, wherein the processing unit is operative to:
  detect an infringement event by an infringing access point (AP) on a Restricted Target Wake Time (rTWT) transmission opportunity (TxOp) associated with a victim AP;
  add information associated with the infringement event to an infringement list, wherein the information includes a Media Access Control (MAC) address associated with the infringing AP;
  receive, by a controller, the infringement list;
  notify, by the controller, the infringement event to the infringing AP;
  determine, by the infringing AP, whether a transmission associated with the infringement event is low latency and high priority;
  when the transmission is not low latency and high priority, modify, by the infringing AP, future transmissions based on a notification; and
  when the transmission is low latency and high priority:
    notify, by the infringing AP, that the transmission is low latency and high priority to the controller, and
    create, by the controller, a negotiation between the victim AP and the infringing AP, wherein the negotiation comprises managing future transmissions of the victim AP and the infringing AP.

9. The system of claim 8, wherein the victim AP:
detects the infringement event by the infringing AP; and
adds the infringing AP to the infringement list.

10. The system of claim 8, wherein an external radio:
detects the infringement event by the infringing AP; and
adds the infringing AP to the infringement list.

11. The system of claim 8, wherein the transmission associated with the infringement event is by an infringing station (STA).

12. The system of claim 8, wherein to manage the future transmissions of the victim AP and the infringing AP comprises to (i) modify a victim AP rTWT schedule, (ii) modify an infringing AP rTWT schedule, or (iii) modify the victim AP rTWT schedule and the infringing AP rTWT schedule.

13. The system of claim 8, wherein the rTWT TxOp is associated with a victim STA.

14. A computer-readable medium that stores a set of instructions which when executed perform a method executed by the set of instructions comprising:
  detecting an infringement event by an infringing access point (AP) on a Restricted Target Wake Time (rTWT) transmission opportunity (TxOp) associated with a victim AP;
  adding information associated with the infringement event to an infringement list, wherein the information includes a Media Access Control (MAC) address associated with the infringing AP;
  receiving, by a controller, the infringement list;
  notifying, by the controller, the infringement event to the infringing AP;
  determining, by the infringing AP, whether a transmission associated with the infringement event is low latency and high priority;
  when the transmission is not low latency and high priority, modifying, by the infringing AP, future transmissions based on a notification; and
  when the transmission is low latency and high priority:
    notifying, by the infringing AP, that the transmission is low latency and high priority to the controller, and
    creating, by the controller, a negotiation between the victim AP and the infringing AP, wherein the negotiation comprises managing future transmissions of the victim AP and the infringing AP.

15. The computer-readable medium of claim 14, wherein the victim AP:
detects the infringement event by the infringing AP; and
adds the infringing AP to the infringement list.

16. The computer-readable medium of claim 14, wherein an external radio:
detects the infringement event by the infringing AP; and
adds the infringing AP to the infringement list.

17. The computer-readable medium of claim 14, wherein the transmission associated with the infringement event is by an infringing station (STA).

18. The computer-readable medium of claim 14, wherein managing the future transmissions of the victim AP and the infringing AP comprises (i) modifying a victim AP rTWT schedule, (ii) modifying an infringing AP rTWT schedule, or (iii) modifying the victim AP rTWT schedule and the infringing AP rTWT schedule.

19. The computer-readable medium of claim 14, wherein the rTWT TxOp is associated with a victim STA.

20. The computer-readable medium of claim 14, wherein the information associated with the infringement event further includes (i) a MAC address of an infringing STA associated with the infringement event, (ii) the rTWT TxOp, (iii) the transmission associated with the infringement event, or (iv) any combination of (i)-(iii).

* * * * *